United States Patent [19]

Mikels

[11] Patent Number: 5,437,368
[45] Date of Patent: Aug. 1, 1995

[54] PACKAGING FORMAT AND A POSITIONING DEVICE FOR FASTENERS AND THE LIKE

[76] Inventor: Marshall E. Mikels, 115 15th Ave., Menlo Park, Calif. 94402

[21] Appl. No.: 87,601

[22] Filed: Jul. 2, 1993

Related U.S. Application Data

[62] Division of Ser. No. 805,866, Dec. 10, 1991, Pat. No. 5,256,012.

[51] Int. Cl.⁶ .................. B65D 85/24; B65D 85/62
[52] U.S. Cl. ................................ 206/341; 206/346; 206/347
[58] Field of Search ............... 206/338, 339, 340, 341, 206/342, 343, 344, 345, 346, 347, 820

[56] References Cited

U.S. PATENT DOCUMENTS

| | | |
|---|---|---|
| 2,012,615 | 8/1935 | Mason . |
| 2,335,614 | 11/1943 | Spievak ................................ 408/84 |
| 2,338,765 | 1/1944 | Hartman .............................. 408/112 |
| 3,060,772 | 10/1962 | Crump . |
| 3,083,593 | 4/1963 | Cotter ................................. 408/115 R |
| 3,321,074 | 5/1967 | Marsh .................................. 206/338 |
| 3,718,252 | 2/1973 | Roeder . |
| 3,812,961 | 5/1974 | Merrick et al. ...................... 206/338 |
| 3,885,669 | 5/1975 | Potucek ............................... 206/338 |
| 4,012,161 | 3/1977 | Shulz .................................. 408/112 |
| 4,018,334 | 4/1977 | Lejdejard . |
| 4,019,631 | 4/1977 | Lejdejard et al. . |
| 4,027,992 | 6/1977 | Mackey, Jr. et al. ................. 408/97 |
| 4,167,229 | 9/1979 | Keusch et al. . |
| 4,955,476 | 9/1990 | Nakata et al. .................... 206/347 X |
| 5,005,699 | 4/1991 | Kawashima et al. ............ 206/338 X |
| 5,078,553 | 1/1992 | Dutkiewicz et al. ................ 408/202 |

*Primary Examiner*—Jacob K. Ackun

[57] ABSTRACT

A packaging format for fasteners constituted by a strip of interconnected fastener retainers 10. Each retainer comprises a land of material, typically 9.5×9.5 mm (0.374 inch squared) in plan. Each land 12 has a hole 13 therethrough for receiving a fastener, in the form of a screw 14. The tip 16 of the fastener protrudes approximately 5 mm (0.2 inch) beyond the land. Between adjacent retainers a support 18 is located which would, in use, support the tip 16 of the fastener 14 clear of a work surface 20 while allowing visually unobstructed positioning of the tip 16 of the fastener. The strip also includes a locating tab 24 to assist in the accurate location of a tapping drill hole. This invention also extends to a drilling tool to further assist in drilling the tapping hole in conjunction with the tab 24.

7 Claims, 3 Drawing Sheets

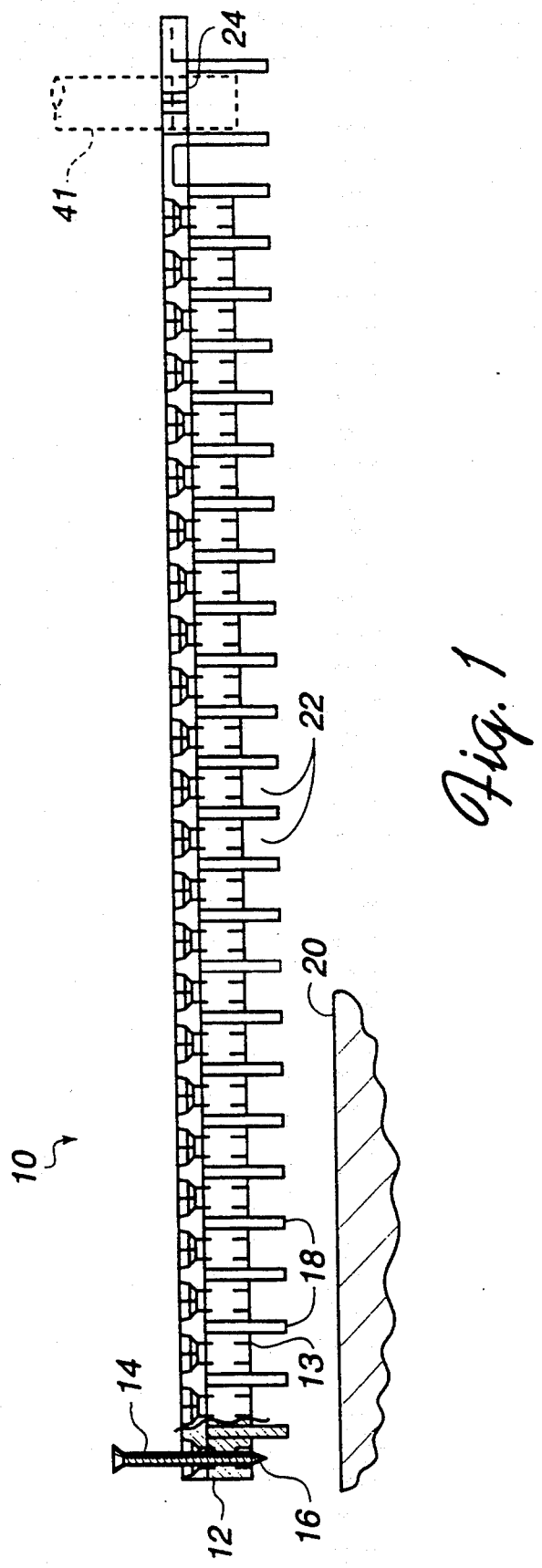

PACKAGING FORMAT AND A POSITIONING DEVICE FOR FASTENERS AND THE LIKE

This is a divisional of application Ser. No. 07/805,866 filed on Dec. 10, 1991, now U.S. Pat. No. 5,256,012.

BACKGROUND OF THE INVENTION

1. Field of the Invention

This invention relates to a packaging format for screws, other fasteners and related tipped devices which would typically be used in carpentry, building and similar industries.

More particularly, the packaging format provides for the positioning of the fasteners or tipped devices in question. This invention also provides for a drilling tool to assist in the pre-drilling of tapping holes for receiving the packaged fasteners, the drill guide being for use, at least partially, with the packaging format.

2. Description of the Prior Art

Packaging formats for fasteners are well known. These formats facilitate the storage and use of the fasteners by the craftsmen concerned. As a result, the wastage of fasteners is reduced to a minimum and accurate and time efficient fastening procedures are possible.

Ideally this packaging, usually in strip format, should allow the craftsman to accurately place the fastener in position. In practice this means that the craftsman concerned should be able to view the tip of the fastener so as to locate it above the precise point on the surface into which it is to be driven. Furthermore, the fastener should be held perpendicularly to that surface. In addition, the tip of the fastener should be held just clear of the surface so as to prevent damage of the surface by the tip of the fastener. This requirement also applies to the tips of all the other fasteners in the same packaging format as well.

A further requirement of a packaging format such as this is that as each fastener is removed from the packaging, the section of the packaging relating to that fastener should be at least partially removed from the main body of the packaging. This allows the following fastener to be in position at the leading edge of the packaging. Furthermore, the packaging format, as with all packaging formats, should use the minimum amount of material.

Finally, the packaging format should, for convenience, be capable of being hand-held by the craftsman concerned, as well as being capable of being used in an automatic fastener fixing machine.

U.S. Pat. Nos. 3,718,252 (Roeder), 4,018,334 (Lejdejard), 4,019,631 (Lejdejard et al.), 4,167,229 (Keusch et al.), 4,955,476 (Nakata et al.) and 5,005,669 (Kawashima et al.) disclose different packaging devices for fasteners all of which allow the tip of the fastener to protrude beyond the boundary of the packaging thus increasing the risk of damaging the work surface with the protruding points of the fasteners in the packaging.

U.S. Pat. No. 3,812,961 (Merrick et al.) provides a fastener packaging format comprising a string of tubular members, each tubular member being sized so as to accept a fastener within its bore. Although the tip of the fastener does not protrude beyond the body of the tube within which it is located it is, as a result of the tubular construction involved, entirely hidden from the sight of the craftsman at the time that such craftsman wishes to apply the fastener to the work surface. This makes accurate placement of the fastener a difficult and a time consuming procedure.

Furthermore, the Merrick patent uses a relatively large amount of material for its packaging format while, at the same time, not making provision for disposal of each tubular element when the respective fastener is removed therefrom.

SUMMARY OF THE INVENTION

It is therefore an object of this invention to provide a packaging format for fasteners which allows for the accurate alignment of the tip of the fastener as well as the alignment of the fastener perpendicular to the work surface concerned while using as little material as possible. Furthermore, the packaging format should be capable of manipulation by hand and machine and should also be constructed such that once a particular fastener is removed from the packaging, the supporting structure at such fastener should at least be partially removed together with the fastener.

According to this invention, therefore, a packaging format for fasteners and the like comprises a strip of interconnected fastener retainers, each retainer comprising a land for receiving a fastener therethrough such that the tip of the fastener protrudes beyond the land; and at least one support for supporting, in use, the land and the tip of the fastener clear of the working surface so as to allow the tip of the fastener to be visually aligned in use.

In addition each retainer may have associated therewith lines of weakness which fracture under action of an enlarged portion of the fastener, causing at least a part of the retainer to break away from the strip and the fastener. Typically, such lines of weakness would be notches, formed in the land and which act to concentrate stress along lines from the apexes of the notches to the point where a fastener passes through the land.

The strip could, at one end thereof, further include a drill locating formation for assistance in drilling suitable tapping holes for the fasteners retained in the strip. Typically, this locating formation comprises a tab in which a suitably sized hole is formed and through which a tapping drill can be passed.

In addition and further according to this invention, a drilling tool comprises a drill bit and a drill bit guide for receiving and guiding the drill bit, the guide including a positioning end for positioning the tip of the drill bit and a torque application end at which torque can be applied to the drill bit.

Preferably, the drill bit includes a keyed formation for receiving a complementally shaped tool by means of which torque is applied to the drill bit.

The drilling tool may include a removable drill bit centering end, the centering end being sized to fit on the locating end of the drilling tool and having a frustoconically shaped leading end for locating the tool into a countersunk hole.

The drilling tool may further include a drill bit retaining formation for retaining the drill bit within the guide. Typically, this retaining formation would be removable to allow for interchangeability for drill bits and for removal of obstructions within the guide.

DESCRIPTION OF THE DRAWINGS

FIG. 1 is a partial sectional elevation on a portion of the packaging format of the invention;

DETAILED DESCRIPTION OF THE INVENTION

Figure 3:
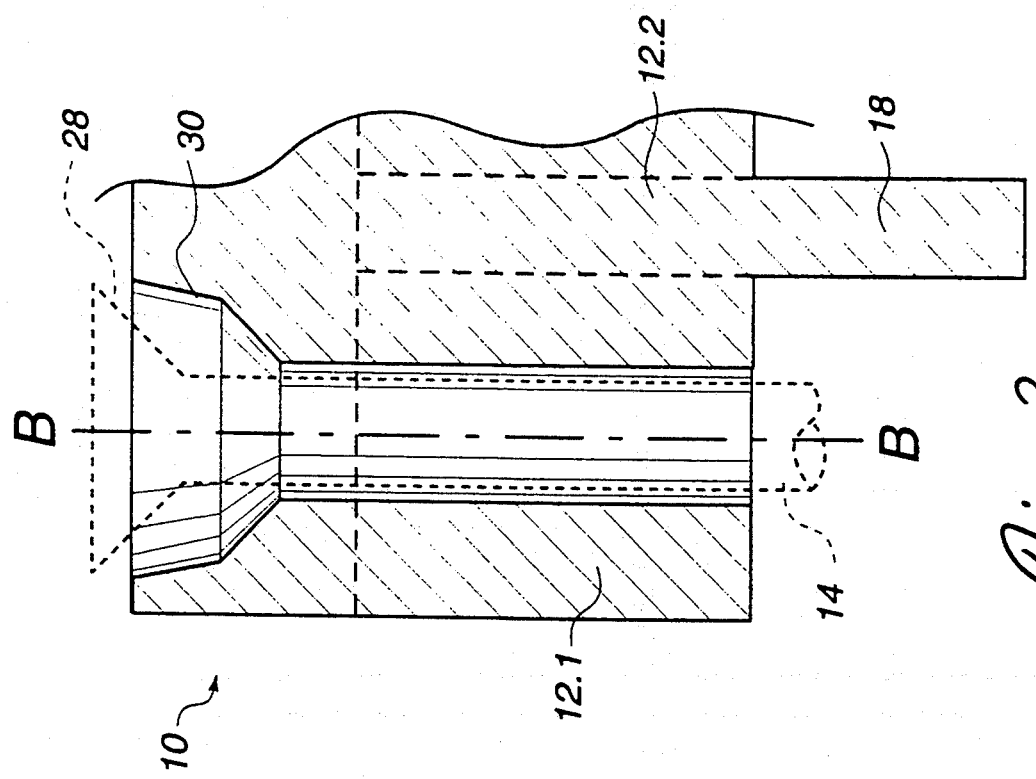
FIG. 3 is a section along lines A—A in FIG. 2.

In FIG. 1, a packaging format for fasteners is shown as being constituted by a strip of interconnected fastener retainers 10. Each retainer comprises a land 12 of material, typically 9.5×9.5 mm (0.374 inch squared) in plan. Each land 12 has a hole 13 therethrough for receiving a fastener, in the form of a screw 14. The tip 16 of the fastener protrudes approximately 5 mm (0.2 inch) beyond the land.

Between adjacent retainers (and fasteners) a support 18 is located. Typically, the support would be of the same material as the land and would, in use, support the tip 16 of the fastener 14 clear of a work surface 20 located beneath the packaging format. This prevents damage from being done by the tip 16 of the fastener 14 to the work surface 20.

As is apparent from the unsectioned portion of the figure the space 22 below the land 12 and between adjacent supports 18 is unobstructed and allows the user of the packaging format to accurately position the tip 16 of the fastener by visual sighting. Also, because the fastener 14 is securely retained by the land 12, the fastener will, in use, be orientated perpendicularly to a work surface 20 on which the packaging format is placed.

Typically, the packaging format, as shown, would comprise twenty four fastener retainers spaced at approximately 9 mm (0.35 inch) center to center intervals.

At one end of the packing format a drill bit locating formation 24 is positioned. This formation, as illustrated, is approximately 33 mm (1.3 inches) long and will be described in more detail with reference to FIG. 4. The formation acts to receive and retain a drilling tool 41 shown in broken lines and which will be described in more detail with reference to FIG. 5.

Figure 2:
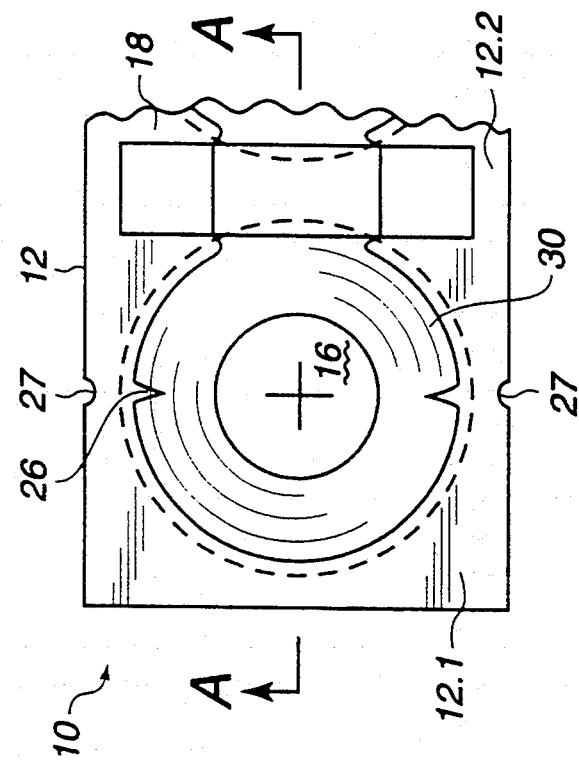
FIG. 2 is a plan view of one of the fastener retainers in FIG. 1.

As can be seen from the detailed drawings in FIGS. 2 and 3, each fastener retainer 10 has a line of weakness associated therewith. This line of weakness coincides with the centerline B—B which, in turn, coincides with the apexes of weakener notches 26 (FIG. 2). As the screw 14 is driven into the working surface the sloping sides of the underside of its head 28 engage the countersunk formation 30 in the land 12. Further movement of the screw 14 into the surface causes radially outward forces to be exerted on the land 12. The notches 26 serve to act as stress concentrators for this force which in turn serves to break the land along line B—B causing the portion 12.1 of the land 12 to be wasted. Portion 120.2 of the land remains integral with the strip until the following fastener 14 is applied to the work surface and the above described process repeated.

As is apparent from FIGS. 1 through 3, the support for each land 12 is in the form of support structure 18. Each support structure 18 in effect gives support to two different lands 12 and their respective fasteners 14. The support structure 18 could be in the form of an inverted U-shaped member formed integrally with the land. Alternatively, the support can taper inwards towards the end that engages the work surface 20 such that the lower end of the support forms an inverted trapezoid when viewed along the longitudinal axis of the packaging format. This arrangement further assists the craftsman in placing the fastener 14 in its correct position.

The packaging format of the invention is capable of being hand held by a craftsman as well as being used in an automatic fastener fixing machine. In operation the fixing machine (not shown) holds the packaging format securely within some form of grasping device. The screw 14 is then driven, by the fixing machine, into the work surface 20. Thereafter, the packaging format is advanced by the machine to bring the next screw into line. In FIG. 2, two advancing notches 27, associated with each hole 13, are shown. The fixing machine engages these notches as it advances the packaging formation along. The advancing notches 27 further function to act in conjunction with weakener notches 26, to further concentrate the stress and assist in the breaking off and wasting of land 12.1, when the screw 14 is driven into the work surface 20.

Figure 4A:
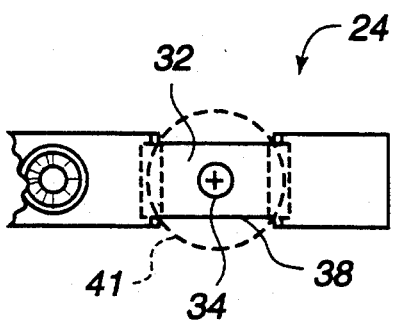
FIG. 4(a) is a plan view of the end of the packaging format at which the drilling tool of the invention can be located.
Figure 4B:
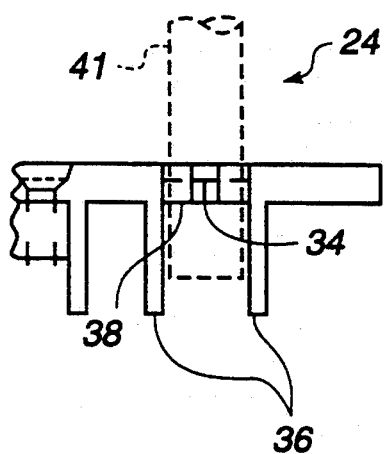
FIG. 4(b) is an elevational view of the end of the packaging format at which the drilling tool of the invention can be located.

In FIGS. 4 (a) and (b) the drill bit locating formation 24 is shown in greater detail. The formation 24 is formed integrally with the material of the packaging format 10. The locating formation comprises a tab 32 through which a hole 34 passes. The hole is sized to receive a drill bit of a diameter suitable for drilling a tapping hole for the fasteners 14. The tab 32 is supported, in use, clear of the work surface 20 by two supporting members 36. Typically, these supporting members are identical to support members 18 on the main body of the packaging format 10. The supporting members 36 also function to, together with the tab 32 located between them, orientate the tapping drill perpendicularly to the work surface 20.

The tab 32 is formed with indentations 38 for receiving the drilling tool 41, shown in broken lines, which assists in drilling the tapping holes.

Figure 5:
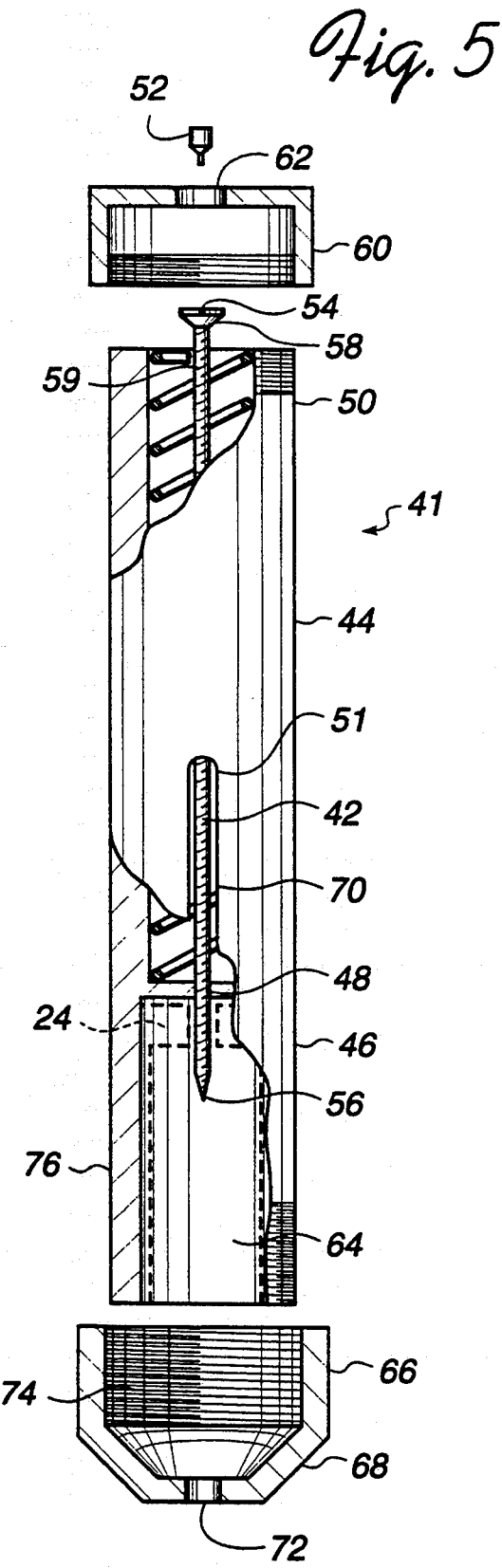
FIG. 5 is an exploded sectional view of the drilling tool of the invention.

A drilling tool of this nature is illustrated in FIG. 5. In this figure the drilling tool 41 is shown to comprise a drill bit 42 which is mounted within a drill bit guide 44. The guide 44 is substantially tubular in shape and is closed off at one end, the positioning end 46, thereof. In use the drill bit 42 passes through a hole 48 in the closed end 46. At the other end, the torque application end 50, torque is applied to the drill bit 42 by means of a key 52 which is driven by a power drill (not shown). A slot 51 is formed in the body of the drill guide and allows for the removal of any material which may be entrained by the drill bit 42.

The key 52, in use, inserts into a keyed formation 54 in an enlarged end portion 58 at the end of the drill bit 42 opposite its tip.

As is apparent from FIG. 5 the enlarged head portion 58 of the drill bit 42 is sized to have a relatively close fit within the inner bore of the tube 44. This acts together with the hole 48 to provide a guiding function for the drill bit. The tool 41 also includes a return spring 59 axially located within its bore. The spring 59 acts to return the drill 42 to its retracted position (as shown) after each drilling operation.

A screw-on cap 60 is removably located on the torque application end 50 of the tube 44. The cap 60 has a hole 62 therein which is sized to receive the keyed tool 52 but is small enough so as to prevent the head 58 of the drill bit 42 from passing therethrough. As a result, the drill bit 42 is retained within the drilling tool.

The positioning end 46 of the tool is shown to comprise a U-shaped formation. This U-shaped formation is formed by cutting a slot 64 into the lower end of the tube, being dimensioned to provide a snug fit over the indentations 38 formed in the locating end 24 (shown in broken lines for clarity) on the packaging format. In this position, the hole 48 in the tool and the hole 34 in the tab 32 are coaxial to allow the drill bit 42 to pass therethrough and onto the work surface 20.

As is illustrated in FIG. 5, the drill tool 41 of the invention further provides for a removable centering cap 66 which includes, at the lower end thereof, a frustoconical portion 68. This portion 68 is sized and shaped to fit within a countersunk bore in, for example, metallic door hinges and the like. In use the drilling tool can therefore be centered directly over the center of the countersunk hole and an accurately placed tapping hole drilled into the work surface. This is possible because the leading end of the frustoconical portion 68 includes a hole 72 which, when the cap 66 is located on the drilling tool is coaxial with the hole 48 in the lower end of the drilling tool. The drill bit 42 is therefore able to pass through the lower end of the cap 66. Furthermore, the cap 66 includes, on its inner bore a threaded portion 74 which allows the cap to be screwed onto a threaded portion 76 on the positioning end 46 of the tool. This allows the user to adjust the effective length of the tool and thereby the depth of hole drilled with any particular drill bit. This length adjusting feature also allows the tool to be used together with drill bits of different lengths.

Typically, the packaging format can be made from plastics or any other suitable disposable material, while the drilling tool may be made from plastics or, if it is intended to be reusable, a more durable material such as aluminum. In addition the drilling tool and the packaging format may be integrally formed so that the format and the tool would be disposed of together.

I claim:

1. A packaging format for fasteners comprising
   an elongated strip of interconnected fastener retainers, each retainer including a land for receiving a shank of a fastener therethrough and retaining the shank such that the tip of the fastener protrudes beyond the land, and
   at least one support for supporting, in use, the land and the tip of the fastener clear of a working surface until the fastener is driven to approach the working surface, said at least one support being configured to allow the tip of the fastener to be directly viewed and aligned by a user when retained in the retainer and protruding beyond the land and clear of the working surface and when the fastener approaches the working surface to confirm the point at which the tip of the fastener will first intersect the working surface.

2. A packaging format according to claim 1, wherein each retainer has associated therewith lines of weakness designed to fracture under action of an enlarged portion of the fastener, causing at least a part of the retainer to break away from the strip and the fastener.

3. A packaging format according to claim 2, wherein the lines of weakness are notches formed in the land and which act to concentrate stress along lines from the apexes of the notches to the point where the fastener passes through the land.

4. A packaging format according to any one of the claims 1 to 3 wherein the support for each land is in the form of at least one leg projecting therefrom and wherein said at least one leg projecting therefrom is positioned between adjacent fasteners and their associated lands.

5. A packaging format according to claim 4
   wherein each retainer is configured to retain a fastener therein perpendicular to the length of the elongated strip.

6. A packaging format according to claim 4 including at one end thereof, a drill locating formation for assistance in drilling suitable tapping holes for the fasteners retained in the strip and wherein the locating formation comprises a tab in which a suitably sized hole is formed and through which a tapping drill can be passed.

7. A packaging format according to claim 2
   wherein said strip is configured to form a beam which can be hand held by a user at one end for manipulation and alignment of a fastener in said strip at another end thereof.

* * * * *